United States Patent
Liu

(10) Patent No.: US 7,489,749 B2
(45) Date of Patent: Feb. 10, 2009

(54) OPTIMUM PHASE TIMING RECOVERY IN THE PRESENCE OF STRONG INTERSYMBOL INTERFERENCE

(75) Inventor: Ming-Kang Liu, 6535 Canterbury Ct., San Jose, CA (US) 95129

(73) Assignee: Ming-Kang Liu, San Jose, CA (US)

( * ) Notice: Subject to any disclaimer, the term of this patent is extended or adjusted under 35 U.S.C. 154(b) by 804 days.

(21) Appl. No.: 10/962,932

(22) Filed: Oct. 9, 2004

(65) Prior Publication Data

US 2005/0185742 A1 Aug. 25, 2005

Related U.S. Application Data

(60) Provisional application No. 60/547,313, filed on Feb. 24, 2004.

(51) Int. Cl.
*H03D 1/06* (2006.01)
(52) U.S. Cl. .................................... 375/348; 375/355
(58) Field of Classification Search .................. 360/46, 360/65; 375/232, 261, 326, 348, 371
See application file for complete search history.

(56) References Cited

U.S. PATENT DOCUMENTS

| | | | | |
|---|---|---|---|---|
| 4,607,230 | A * | 8/1986 | Kaku et al. | 375/376 |
| 5,703,905 | A * | 12/1997 | Langberg | 375/232 |
| 6,055,119 | A * | 4/2000 | Lee | 360/51 |
| 6,175,599 | B1 * | 1/2001 | Lyon et al. | 375/261 |
| 6,212,144 | B1 * | 4/2001 | Asano | 369/47.25 |
| 6,246,444 | B1 * | 6/2001 | Kim | 348/614 |
| 6,285,726 | B1 | 9/2001 | Gaudet | |
| 6,363,129 | B1 | 3/2002 | Agazzi | |
| 6,522,489 | B1 * | 2/2003 | Nagaraj | 360/32 |
| 6,577,689 | B1 | 6/2003 | Smith et al. | |
| 6,650,617 | B1 * | 11/2003 | Belotserkovsky et al. | 370/210 |
| 6,819,514 | B1 * | 11/2004 | Behrens et al. | 360/65 |
| 6,856,655 | B1 * | 2/2005 | Garcia | 375/326 |
| 6,947,512 | B1 * | 9/2005 | Shinoda et al. | 375/371 |
| 6,952,444 | B1 * | 10/2005 | Segal et al. | 375/232 |
| 6,985,548 | B1 * | 1/2006 | Jabbar et al. | 375/355 |
| 2002/0097823 | A1 * | 7/2002 | Kobayashi et al. | 375/355 |
| 2003/0142687 | A1 | 7/2003 | Lin | |
| 2004/0196938 | A1 * | 10/2004 | Long et al. | 375/371 |
| 2004/0223567 | A1 | 11/2004 | Liu | |
| 2005/0185742 | A1 * | 8/2005 | Liu | 375/348 |

FOREIGN PATENT DOCUMENTS

WO  WO01/91361  A1  11/2001

OTHER PUBLICATIONS

Mueller et al ("Timing Recovery in Digital Synchronous Data Receivers" IEEE Transactions on Communications, IEEE Inc. New York, US, vol. 24, No. 5, May 1, 1976, pp. 516-531).*

(Continued)

*Primary Examiner*—David C Payne
*Assistant Examiner*—Leon-Viet Q Nguyen

(57) ABSTRACT

A data communication device with a receiver for receiving and processing incoming signal having intersymbol interference component to produce resultant signals with less interference. The processor includes a timing recovery processor for recovering a clock signal from the sample streams of the incoming signal. The recovered clock signal is also suitable for signal detection of the incoming signals under strong intersymbol interference.

7 Claims, 8 Drawing Sheets

OTHER PUBLICATIONS

International Search Report dated Jun. 8, 2005 for corresponding Application No. PCT/US2005/005959.

Mueller K.H. et al. "Timing Recovery in Digital Synchronous Data Receiver" IEEE Transactions on Communications. vol. 24, No. 5, May 1, 1976 pp. 516-531.

A. Nayak; J.R. Barry; S.W. McLaughlin: "Iterative Timing Recovery and Turbo Equalization", 3rd International Sumposium on Turbo Codes, "Online" Sep. 1, 2003—Sep. 5, 2003. XP002328648. Brest, France.

Zhu Quanqing: Zou Xuecheng; Shen Xubang: "Desing and Implementation of a clock recovery circuit for fast Ethernet applications". Journal of Systems Engineering and Electronics, vol. 15, No. 4, 2004, pp. 507-510. XP009047720. China Ocean Press Beijing.

K. H. Mueller and M. Muller, "Timing Recovery in Digital Synchronous Data Receivers," IEEE Transactions on Communications, pp. 516-531, vol. com-24, No. 5, May 1976.

* cited by examiner

OPTIMUM PHASE TIMING RECOVERY IN THE PRESENCE OF STRONG INTERSYMBOL INTERFERENCE

RELATED APPLICATION

The present application is based upon and claims priority benefit of provisional application Ser. No. 60/547,313, entitled "Optimum Phase Timing Recovery in the Presence of Strong Intersymbol Interference", which was filed on Feb. 24, 2004.

FIELD OF THE INVENTION

The present application relates to band limited communication systems where timing recovery at the optimum phase is required in the presence of strong intersymbol interference (ISI).

BACKGROUND

Timing recovery is one of the fundamental operations in digital communications to recover the transmitted data. In general, digital communications can be done in either baseband or passband. In the latter case, the encoded baseband signal is further modulated to a high carrier frequency for transmission. Examples of baseband systems include Fast Ethernet (100 Mb/s) and Gigabit Ethernet over copper (1 Gb/s) as defined by IEEE 802.3ab. Examples of passband communications include gigabit Ethernet over fiber and wireless LAN (local area network) systems as defined by IEEE 802.11a, 11b, and 11g.

In contrast to carrier frequency recovery in passband communications for moving the modulated signal from passband to baseband, timing recovery regenerates a baseband clock for sampling and decoding the baseband signal. Therefore, timing recovery is required in both passband and baseband communications. To achieve proper decoding, timing recovery in the receiver is required to recover the clock of the remote transmitter and to operate at a certain sampling phase to optimize the receiver performance. Various techniques have been devised in the past for timing recovery of remote transmitters. For example, U.S. Pat. Nos. 6,285,726; 6,363,129; 6,577,689; and U.S. patent application 2003/0142687A1 describe applications of timing recovery schemes. The description of the timing recovery systems and the applications in data communication systems of these patent documents are incorporated by reference in their entireties. It is to be understood that the present invention can be implemented in data communication systems with one or more transceivers having receivers and transmitters. Examples of applications of the invention of the present application include IEEE 802.3 Fast Ethernet, Gigabit Ethernet over copper, and ITU-T G.991 high-speed digital-subscriber-line (HDSL) transceiver systems.

Most clock recovery schemes use a phase lock loop (PLL). FIG. 1A illustrates a basic timing recovery scheme involving a phase lock loop 10. As shown in FIG. 1A, the typical phase lock loop 10 consists of a phase detector (PD) 12, a loop filter (LF) 14, and a voltage or current controlled oscillator (VCO or ICO) 16. The purpose of the phase detector 12 is to detect the phase difference between the received signal 18 and the recovered clock signal 20 from the timing recovery mechanism. When the received signal 18 has sufficient transitions and has negligible intersymbol interference (ISI), a simple phase detector 12 that compares the received signal 18 transitions with the voltage or current controlled oscillator output 20 can be deployed. Such schemes have been widely incorporated in timing recovery systems of the past. The purpose of the loop filter 14 is to reduce jitter from a signal 22 from a phase detector 12 to generate a signal 24 whose steady state value can operate the voltage or current controlled oscillator 16 at a frequency equal to that of the received baseband signal.

As also shown in FIG. 1A, once the clock is properly recovered by the phase lock loop 10, it can be fed to an analog-to-digital converter (ADC) 26 to drive the sampling of the received signal 28 in the analog domain and to convert its amplitude to a digital representation 29 for subsequent digital signal processing (DSP) to decode the original transmitted data. In general, the sampling phase of the recovered clock that samples the received signal affects the signal-to-noise ratio (SNR) in digital signal processing DSP, which in turn affects the receiver performance. As illustrated in FIG. 2, the optimum sampling phase of a pulse response is at the "Signal" point. Therefore, it is important for the timing recovery system to regenerate a clock that is optimum in phase to sample the received analog signal.

Although many timing recovery designs have the same general phase lock loop structure shown in FIG. 1A, actual implementation of the phase detector PD, loop filter LF, and voltage VCO or current controlled oscillator ICO can be very different for different applications. As illustrated in FIG. 1B, one method of phase detection is by a method commonly called edge detection. In this detection scheme, the phase difference 35 is simply determined by measuring the lag from the leading edge 32 of a received data 34 pulse to the leading edge 36 of a recovered clock 38 pulse that is immediately after the data pulse. However, as illustrated in FIG. 2, when the received signal 41 suffers from a strong intersymbol interference (ISI) due to a band limited channel, a simple edge detection phase detector PD will fail, as the received signal has rising and falling slopes corresponding to precursor intersymbol interference ISI 42 and postcursor intersymbol interference ISI 44 and therefore has no clear step transitions like those of square pulses, and therefore no clear leading edges. One way to deal with this problem is to correlate the received signal with the detected output. From statistics, one can show that the correlation output between the two signals is a monotonic function of the phase difference between the data transitions and the recovered clock. The correlation, thus, can be used in the phase detector PD to generate the phase error term. This approach, known in the prior art, is commonly referred as the Mueller-Muller (M&M) method and is illustrated in FIG. 3. In FIG. 3, the received signal 45 (having value $r_k$) and the detected signal (e.g., the slicer output) 43 (having value $a_k$) are used for a computation by the M&M method for phase detection given as follows.

$$z_k = r_{k-1} a_k - a_{k-1} r_k$$

Four DFF's (digital flip-flop) 46 in FIG. 3 are used to generate the delay versions of the received signal 45 and detected signal 43. The computation output ($z_k$) is sent to a loop filter (LF) 49 to drive VCO (or ICO) 48, which can be either voltage or current controlled oscillator. For those who are skilled in the art, the above equation can be modified according to the statistics of the decoded output $a_k$ and the pulse respones shown in FIG. 2 so that the computation output ($z_k$) can generate a similar phase error term.

One critical limitation of the Mueller-Muller M&M method, however, is that it requires correct detection of the original transmitted symbols ($a_k$), which in turn requires proper equalization adaptation to reduce the intersymbol interference ISI for correction detection. To remove or reduce intersymbol interference ISI for correct signal detection, a typical receiver 50, as shown in FIG. 4, includes both the feed-forward-equalizer (FFE) 52 and decision-feedback-equalizer (DFE) 54. A received (or incoming) signal 51 with ISI is processed by the receiver 50. As used herein, the term "strong intersymbol interference ISI" refers to intersymbol interference ISI that needs equalization adaptation for signal detection. The result of this equalization is fed to a slicer 56, which detects the original transmitted amplitude from the input signal level. Since the channel impulse is unknown, both equalizers 52, 54 need to be trained to more efficiently remove or reduce the ISI. A standard method of training the equalizer is called stochastic least-mean-square (LMS) method. In brief, this method computes the difference between the slicer 56 input and output, called Slicer Error, and uses this error output to adapt the equalizer coefficients. The decoded slicer output 58 is fed to the Mueller-Muller (M&M) phase detector PD 57, whose output is in turn fed to a loop filter 61, and passes to a voltage VCO (or current controlled oscillator ICO) 62. This stochastic least-mean-square LMS training method, however, does not always work. One condition for the stochastic least-mean-square LMS method to be successful in training the equalizer is to sample the received signal at a good phase, which needs to be within a certain range.

When intersymbol interference ISI is strong and before the equalizer is properly trained, the decoded output may have many errors. As a result, the decoded output 58 fed to the Mueller-Muller M&M phase detector PD 57 would not generate a correct phase error for clock recovery. Since successful equalizer training depends on good clock recovery, the challenge for proper timing recovery and equalizer training becomes a "chicken-and-egg" problem, i.e., one needs good clock recovery to train the equalizer, but one also needs a trained equalizer to recover the clock.

Another limitation of the Mueller-Muller (M&M) method is that it does not provide information related to optimum phase sampling for maximizing the signal detection performance. Although, as shown in FIG. 4, the M&M phase detector PD 57 generates an output that is a monotonic function of the phase error, its zero crossing does not necessarily correspond to the optimum phase that results in the maximum signal to noise ratio SNR in digital signal processing DSP. In fact, the zero-crossing location is dependent on the channel impulse response.

To solve the timing recovery problem in the presence of strong intersymbol interference ISI, several different schemes have been proposed. In one method, a pre-cursor filter is introduced between the analog-to-digital converter ADC 60 output and the feed forward equalizer FFE 52 input to shape the received waveform for Mueller-Muller M&M based timing recovery. In another method, a separate clock that runs at 8/7 of the symbol clock is used to present the timing recovery problem to an interpolation problem of analog-to-digital converter ADC output samples. In both of these prior methods, the decoded output 58 from the slicer 56 is still used to control the timing. Therefore, they are still subject to the mutual dependence issue of the equalizer training and timing recovery.

In yet another method of timing recovery, a separate analog-to-digital converter ADC 70 (not the one shown in FIG. 1 for signal detection) that operates at twice (2 times) of the symbol rate (or baud rate) is used (referred as 2×ADC). Symbol rate is the number of symbols per second transmitted, where each symbol is a modulated pulse that carries a certain number of information bits. For example, in the case of 10 Mb/s Ethernet, the symbol rate is 10 M (mega) symbols per second, and each symbol carries one bit. The data rate is 10 Mb/s. For gigabit Ethernet, the symbol rate is 125 MHz, and each symbol is a vector of four signals. That is, four parallel lines are transmitted inside a CAT-5 Ethernet cable. Each four-vector symbol together carries 8 information bits. Therefore, the total data rate is 1 gigabit per second. In telecommunication terminology, symbol rate and baud rate are used interchangeably. That is, they mean exactly the same thing. On the other and, symbol rate and data rate are different. The relationship can be represented by: (data rate)=(symbol rate)×(net information bit carried by each symbol). This method of timing recovery samples the received analog signal 72 to generate two sample streams with their sampling phase difference by half of the symbol interval, as shown in FIG. 5. In this method, the received analog signal 72 is converted to digital signal by the 2×ADC 70 and is processed by the demultiplexer 74 into an even stream 76 and an odd stream 78. A 2×ADC uses a sampling clock that is twice of the symbol rate to sample the received signal stream and to convert the analog signal to digital signal, whereas a 1×ADC uses a sampling clock that is at the same symbol rate to sample a received signal stream at the symbol rate to convert the signal from analog to digital format. As a result, a 2×ADC generates two samples from the received analog signal every symbol interval, and a 1×ADC generates only one sample every symbol interval. An even sample stream of a 2×ADC is a sample stream from every other sample of the 2×ADC output, and an odd sample stream of the 2×ADC is a sample stream of samples that interleave with the even sample stream. Therefore, the even and odd sample streams have a sampling time difference of half of the symbol interval, and both the even sample stream and the odd sample stream have one sample every symbol interval. With these two streams of samples, as shown in FIG. 5A, autocorrelations R[0] and R[1] for each of these streams are computed by calculator processor 80, 82 to generate a phase error output 84 for driving the loop filter (LF) 86. Output from the loop filter 86 is passed to a voltage or current controlled oscillator VCO 88, the output of which goes back to the 2×ADC 70 for feedback. This method does not require input from either the equalizer output or the slicer output. Therefore, it avoids the need to have a correct detected output and can robustly recover the clock. Once the clock is recovered, a delayed version of the clock that maximizes R[0]−R[1] can be used to sample the received signal for DSP.

FIG. 5B illustrates a receiver 90 that incorporates the timing recovery scheme of FIG. 5A. A separate 1×ADC analog to digital converter is used to sample the received signal for equalizer training and signal detection. An incoming analog signal 72 passes to the timing recovery system 92 according to the timing recovery scheme of FIG. 5A. A clock signal 94 is recovered from the incoming signal and is delayed through a delay-tap logic (which includes delay select logic 96 and delay taps 98) for driving the sampling the 1×ADC analog to digital converter 100 to convert the incoming analog signal 72. The digital output from the 1×ADC 100 is sent through the equalizer 102 to the detector 104 to result in recovered data 106. To train the equalizer, the output from the 1×ADC 100 is processed through processor 108 to find the difference in autocorrelations R[0]−R[1] to determine the additional delay for the sampling clock 99 via the delay logic.

The method of FIG. 5A and FIG. 5B, however, still has limitations. First, it requires a separate ADC, i.e., it needs to have two ADC's (analog to digital converters) for processing one received signal stream—one 2×ADC to recover the clock and another 1×ADC to train the equalizers. The reason is that the sampling phase from the clock recovery is not within the range for the equalizer to be trained. Therefore, a separate 1×ADC is required for actual signal detection, and its sampling clock has a certain delay from that of the recovered clock. The second limitation is that the 2×ADC used in clock recovery operates at twice of the symbol rate (i.e., a 2×ADC is needed). This thus requires higher speed implementation.

Thus, there is a need for a clock recovery technique and system in which less demanding analog to digital converter systems are required.

SUMMARY

To overcome the limitations of prior data transmission systems, the present invention provides a new technique that recovers the clock directly from the received signal in the presence of a strong intersymbol interference ISI. Furthermore, it does not require two separate ADC's for processing a single incoming signal stream, i.e., not needing one for timing recovery and one for signal detection. The reason that the need for a separate ADC can be avoided is that the sampling phase from timing recovery is automatically about optimum for received samples in the subsequent digital signal processing DSP.

In one aspect, the present invention provides a data communication device that includes a receiver for receiving and processing one or more incoming signals, a timing recovery processor for recovering a clock signal for sampling one or more of the incoming signals, and a detection circuit to recover original transmitted data from the receiver output. The receiver receives the signal with intersymbol interference components and produces resultant signals with less interference. The recovered clock signal having a phase also being suitable for the receiver to reduce the intersymbol interference components.

In another aspect, the present invention also provides a data communication device that includes N receivers for receiving and processing N incoming signals having intersymbol interference components to produce resultant signals with less interference (where N is an integer bigger than 1), at least one first timing recovery processor for recovering the clock signals for sampling the N incoming signals before the receivers are trained, detection circuits to recover original transmitted data from the N receiver output; and at least one second timing recovery processor for tracking the clock signals after the receivers are trained. The receivers have equalizers that need to be trained to process the incoming signals according to the phases thereof.

The present invention also provides methods for data communication. In one aspect, the method includes receiving one or more incoming signals at a symbol rate and having intersymbol interference component and recovering resultant signals with less interference. The method recovers resultant signals via recovering a clock signal for sampling the one or more incoming signals. The clock signal is suitable for signal detection of the incoming signals under strong intersymbol interference.

Because the present invention uses an analog-to-digital converter efficiently, less number of ADC is needed than in prior art data transmission schemes. In one aspect, an ADC functions to recover a clock of the incoming signal, as well as samples the incoming signal at a suitable phase for the receiver to reduce the intersymbol interference. One embodiment of the technique of the present invention includes one 2×ADC that operates at twice of the symbol rate when there is only one transceiver in the system. A second embodiment of the new technique includes one 1×ADC per transceiver to operate at the symbol rate when there is more than one transceiver in the system. In the second embodiment, for example, two 1×ADC's operating at the symbol rate are used together and take turn to recover the timing(s) of the two signal streams. Once timing is recovered for one signal, its corresponding receiver can be trained for signal recovery to reduce the intersymbol interference. When both receivers (for both signal streams) are trained, each receiver and its timing recovery will operate on its own, where prior art methods that require only one ADC at the symbol rate for timing recovery can be used.

DETAILED DESCRIPTION OF INVENTION

Figure 6:
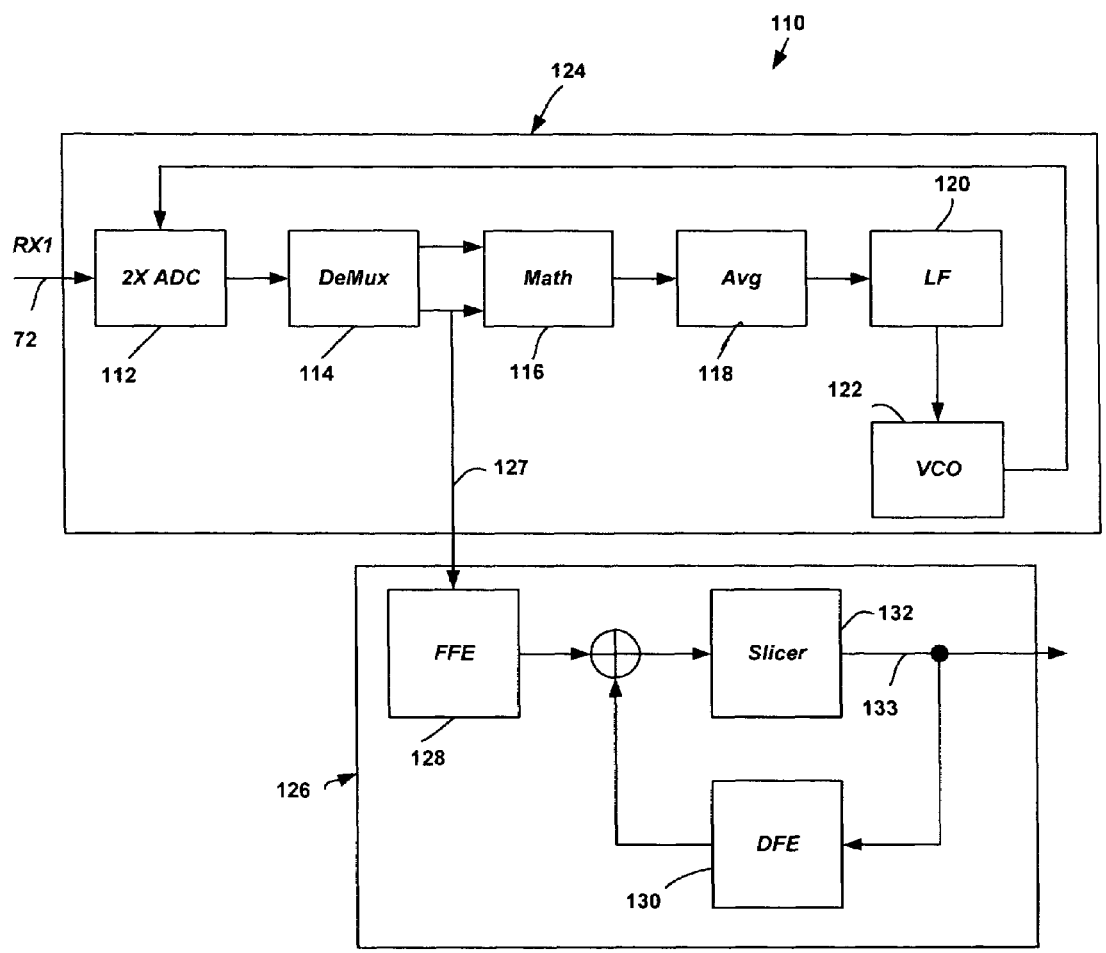
FIG. 6 shows the block diagram of clock recovery of the present invention in a first embodiment when there is only one transceiver in the system.

The present invention provides a transceiver and timing recovery system and technique in which only relatively inexpensive analog to digital converting systems are needed. As shown in FIG. 6, an embodiment of the transceiver and timing recovery system 110 includes a 2×ADC, demultiplexer 114, a math processor 116, averager 118, loop filter 120, voltage or current controlled oscillator VCO (or ICO) 122. The embodiment shown in FIG. 6 can be generally considered to include a clock signal recovery system 124 and a receiver 126 that includes feed-forward-equalizer (FFE) 128, decision-feedback-equalizer (DFE) 130 and slicer 132 wherein the equalizers FFE 128 and DFE 130 are trained to reduce strong intersymbol interference to result in the recovered signal 133. A received signal 72 enters the system 110. The demultiplexer 114 separates the 2×ADC output to an even and an odd-sample stream, one of which is forwarded to the receiver 126. The math processor 116 uses the even and odd-sample streams to compute an output according to EQ (1) below. The averager 118 averages the math processor output over a certain period of time.

As shown in FIG. 6, there is only one analog to digital converter ADC, i.e., the 2×ADC 112 for both timing recovery and signal detection. The timing recovery uses the 2×ADC 112 to compute a phase error signal to drive loop filter LF and voltage VCO (or current controller oscillator ICO) in clock recovery. Once timing recovery is done, one of the two ADC output streams coming off the demultiplexer 114 is fed to the receiver 126 for equalizer training and transmitted data detection. Therefore, the same ADC is used for both timing recovery and signal detection. In this scheme, there is one received signal stream and only one ADC (the 2×ADC 112) is needed to recover the clock and to train the equalizers. No M&M phase detector is needed. However, if desired, a different phase detector PD can be included to enable continuing timing recovery once the clock is initially recovered by the scheme of FIG. 6. This can be done by using the M&M PD to find the phase difference between the signal from the ADC (or from the FFE) and the detected signal from the slicer.

In further details, an aspect of the operation of the present invention is described as follows. Let the two output streams from the 2×ADC be $x_k=r(kT)$ and $y_k=r(kT+0.5\ T)$, respectively, where T is the period of the symbol rate and k is an integer as an index to the sampling position in the sampling order. For convenience's sake, let the first stream be referred to as the even stream, and the second stream be referred to as the odd stream, and one lags behind the other by 0.5 T. These two streams were separated by the demultiplexer 114 and fed to the mathematical processor 116.

With the above output streams from the 2×ADC, the mathematical processor (math block) 116 in FIG. 6 performs the following computations:

$$z_k=(x_{k+1}-x_k)(y_{k+1}-2y_k+y_{k-1}) \quad \text{EQ (1)}$$

Thus, the math block 116 takes the difference of two consecutive samples of the even output stream of the ADC and multiplies it with the difference of two end samples from twice the mid sample of three consecutive samples of the odd stream (lags the first stream by 0.5 T) from the same ADC. This computation output is taken average over a programmable period, e.g., over 8 to, for example, 512 or more, e.g., 2048 symbol clock cycles (typically in power of 2 to simplify actual hardware and software implementation). This averaging gives a periodic waveform as a function of the sampling phase and has zero crossing at a phase optimum or close to optimum for training equalizers to recover the signals. In other words, reducing $z_k$ to zero leads to a phase optimum or about optimum for training equalizers to recover the signals. Obviously, other programming periods are applicable and can be easily selected by one skilled in the art. This average output is input to a loop filter LF, which can then generate a voltage to drive the voltage or current controlled oscillator VCO/ICO to generate the recovered clock.

Because the phase of the recovered clock from the phase lock loop in the clock recovery system 124 will result in a zero or close-to-zero value at the output of the phase detection, use of EQ (1) for doing phase detection will result in optimum or close-to-optimum sampling of the received signal for signal detection (i.e., the sampling phase results in successful equalizer training and maximum SNR for signal detection). With this property, there is no need for a separate ADC in doing equalizer training in addition to the ADC for timing recovery as shown in FIG. 5B.

One aspect of the present invention is the discovery of using EQ (1) for timing recovery and for optimum phase sampling at the same time. The reason EQ (1) used for phase detection can also result in the optimum sampling phase is described as follows.

For a received signal of the form:

$$r(t) = \sum_k A_k h(t-kT) \quad \text{EQ (2)}$$

where $A_k$ is the amplitude modulated output of the transmitted data and h(t) is the pulse response of the transmission channel. Sampling the signal at the symbol rate will result in a sampled output of the form:

$$r_n = r(nT+\phi) = \sum_{k=-\infty}^{\infty} A_k h(nT-kT+\phi) = \sum_{k=-\infty}^{\infty} A_{n-k} h(kT+\phi)$$

where $\phi$ is the sampling phase. With a delay of m symbol intervals, the time averaged m-th autocorrelation is $$R_r[m] = \frac{1}{N}\sum_{n=0}^{N-1} (r_n r_{n+m})$$

From EQ (2), if each transmitted amplitude $A_k$ is independent of $A_j$ for $k \neq j$, we can find that $R_r[0]-R_r[1]$ is given by:

$$R_r[0] - R_r[1] = \frac{1}{2}E[A_k^2]\sum_{n=-\infty}^{\infty}(h_n - h_{n+1})^2 \quad \text{EQ (3)}$$

This autocorrelation function is a periodic function of the sampling phase $\phi$. The optimum phase for signal detection by training equalizers for interference (noise) reduction is the phase that results in the maximum SNR at the input to the slicer for signal detection. One choice of locating this optimum phase is to maximize the value of $R_r[0]-R_r[1]$. Alternatively, one can locate the optimum phase by maximizing the value of $R_r[0]$. In general, the two phases that optimize the values $R_r[0]-R_r[1]$ and $R_r[0]$, respectively, are close to each other and can both be used as the sampling phase for training the equalizers and for signal detection. In the following discussion, we use $R_r[0]-R_r[1]$ as the criterion to locate the optimum sampling phase. One who is skilled in the art, based on the present application, can use $R_r[0]$ to derive a similar function for doing the phase detection.

Figure 5A:
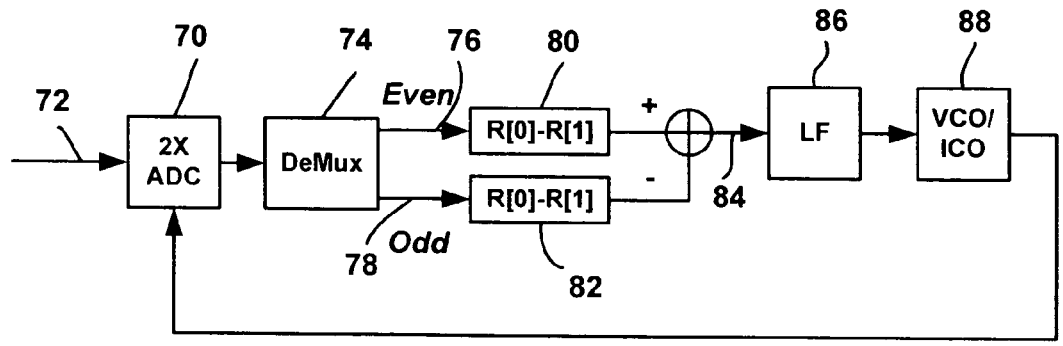
FIG. 5A illustrates a prior timing recovery scheme that uses a separate 2×ADC for clock recovery.
Figure 5B:
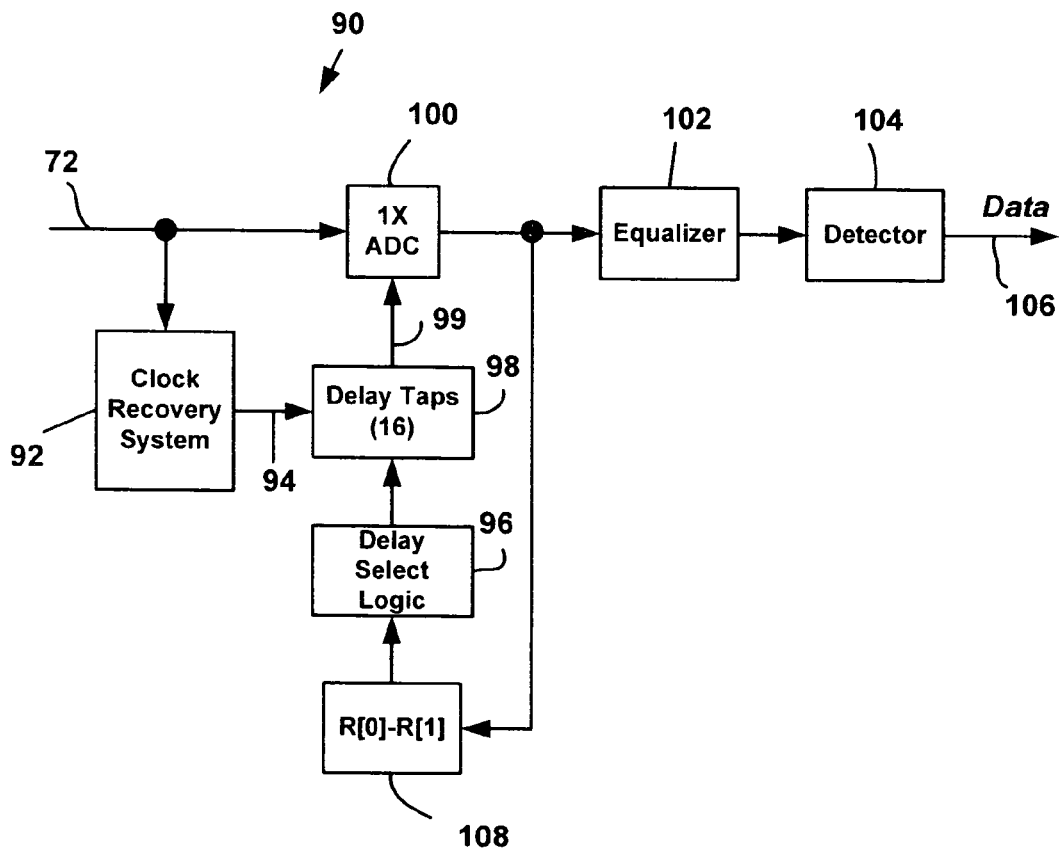
FIG. 5B illustrates a prior receiver device with a timing recovery scheme of FIG. 5A, showing a separate 1×ADC for signal detection.

Since the sampling phase of the recovered clock from timing recovery in FIG. 5A at a steady state results in zero crossing at the phase detector output, use of the same $R_r[0]-R_r[1]$ function as the phase detection function will not result in a maximum or close-to-maximum value of $R_r[0]-R_r[1]$. In the present invention, it is discovered that a different phase detection function whose zero crossing will result in a maximum value of $R_r[0]-R_r[1]$. With this new function, the phase values that result in peak values at the phase detector output will result in a close-to-zero value for the autocorrelation function $R_r[0]-R_r[1]$, and the phase values that result in zero values at the phase detector output will result in close-to-peak values of $R_r[0]-R_r[1]$. The latter case is what is desired from timing recovery to enable signal detection under strong intersymbol interference.

According to the present invention, recognizing that $R_r[0]-R_r[1]$ is generally sinusoidal, one can achieve a new phase detection function that has a 90° phase difference from that of EQ (3) by taking the derivative of EQ (3) with respect to the sampling phase φ. With this, the peak values of the new phase detection function and $R_r[0]-R_r[1]$ have a shift of 90° in phase, and the zero crossing of the phase detection function corresponds to the peak value of EQ (3). In other words, this new phase detection function will result in a recovered clock that has a 90° phase difference from that of FIG. 5A. Therefore, this new phase detection function can be used to recover a clock signal that is also suitable for sampling the incoming signals under strong inter-symbol interference. As a result, there is no need to generate another signal of 90° phase difference from that of the clock signal for optimal signal detection, as is needed in the scheme of FIG. 5A. For this reason, an additional ADC is not necessary for equalizer training in the present invention as the scheme of FIG. 5B needs.

Taking the derivative of EQ (3), we have $$\frac{\partial}{\partial \phi} \sum_{n=-\infty}^{\infty} (h_n - h_{n+1})^2 = 2 \sum_{n=-\infty}^{\infty} (h_n - h_{n+1})\left(\frac{\partial h_n}{\partial \phi} - \frac{\partial h_{n+1}}{\partial \phi}\right) \quad \text{EQ (4)}$$

With this, one can take the following two steps to obtain the phase detection function of EQ (1) as an approximation to EQ (4). First, use the following approximations for the derivatives:

$$\frac{\partial h_n}{\partial \phi} \approx \frac{h_{n+0.5} - h_{n-0.5}}{T} \quad \text{EQ (5)}$$

With this, if the transmitted symbol $A_k$ given by EQ (2) is statistically independent of other symbols (that is, the expectation value of $A_k A_j$ is zero when $k \neq j$), one who is skilled in the art can show that EQ (1) is the desired phase detection expression for EQ (4).

Although EQ (1) is used in this disclosure, those who are skilled in the art can have a different equation to approximate EQ (5) and to generate a different phase detection function other than EQ (1). Furthermore, one who are skilled in the art can have a modified equation to EQ (1) to approximate EQ (4) when transmitted symbols $A_k$ in EQ (2) are not completely independent.

With the new function given by EQ (1), its zero crossing with respect to that of $R_r[0]-R_r[1]$ given by FIG. 5A is shifted by 90 degrees. As a result, the clock phase from the timing recovery coincides with the optimum phase required for training the equalizers. Therefore, as shown in FIG. 6, one of the 2×ADC output streams (e.g. the even output) 127 can be used to train the equalizers for signal detection.

Figure 7:
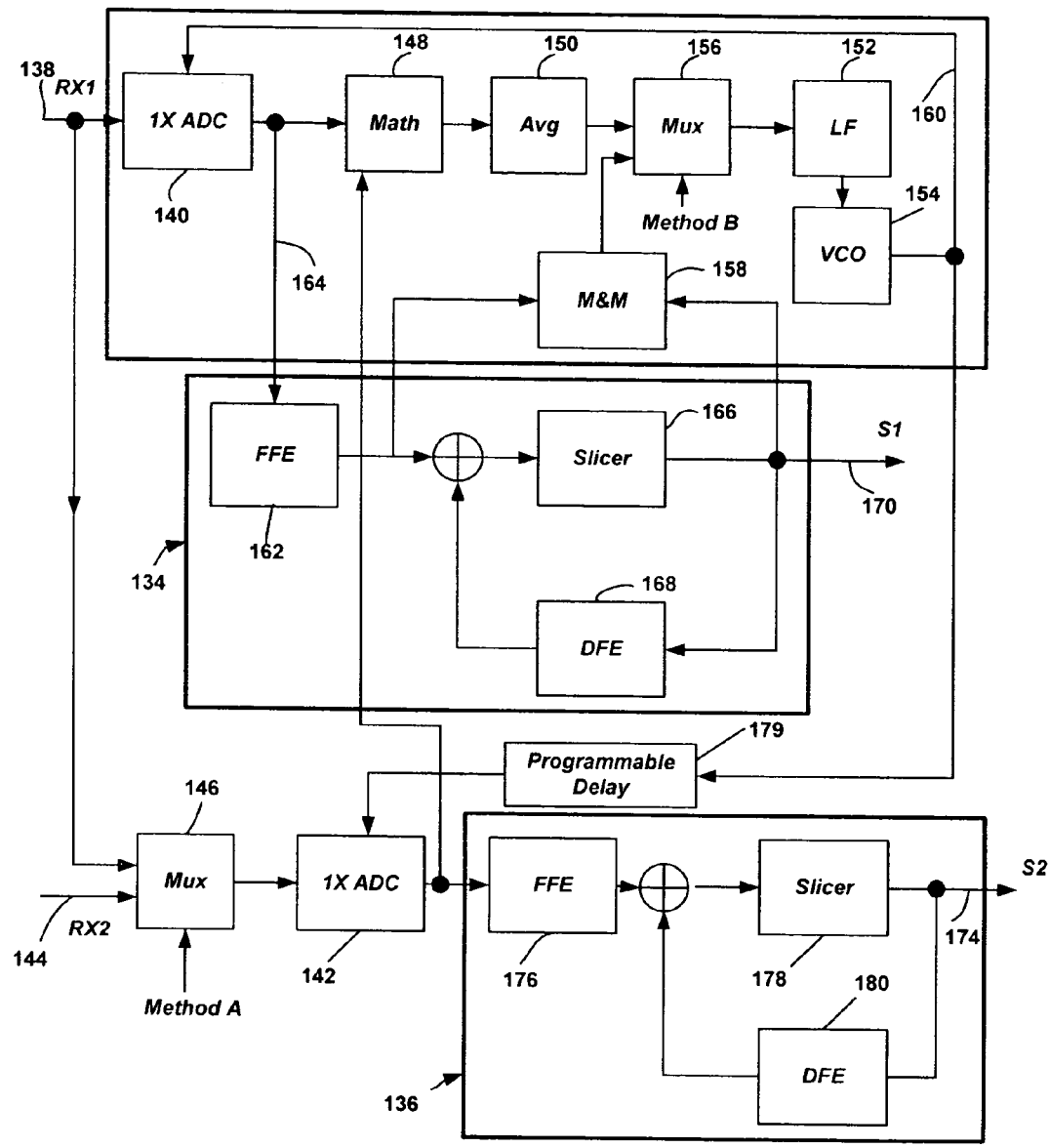
FIG. 7 shows the block diagram of clock recovery of the present invention in a second embodiment when there are more than one transceiver in the system.

In the second embodiment of the invention, shown in FIG. 7, there are more than one receiver in the system that operate on the same clock. Therefore, only one timing recovery circuit is needed to recover the remote transceiver clock. Since we need to have two analog to digital converters ADC's to sample the two received signals, we can use two 1×ADC (sampling the received signals at the symbol rate) to replace the 2×ADC in the first embodiment. With this, the timing recovery and signal detection process is described as follows. In this scheme, although we need more than one ADC for signal detection and time recovery initially to train equalizers, only one ADC at the symbol rate is needed after the equalizers are trained. Therefore, with the arrangement disclosed below, only one ADC per input signal at the symbol rate is required.

Although a system of two receivers 134, 136 is described in this embodiment, it is contemplated that the present invention can be extended to multiple received signal streams and still no more than one ADC per received (i.e., input) signal streams will be necessary to recover the clock and train the equalizers for signal detection.

In the embodiment of FIG. 7, during the first timing recovery, the first received signal ("RX1") 138 is fed to both ADC's 140, 142, which have the sampling clocks with phase difference by half of the clock period. This clock delay can be achieved by a programmable delay logic. Received first signal RX1 138 is digitized (sampled) by the first ADC (which is a 1×ADC) 140. Also, the first multiplexer 146, which can receive either incoming first signal (RX1) 138 or second signal ("RX2") 144, selects RX1 138 and directs it to the second ADC (which is a 1×ADC) 142 to be digitized. Both digitized signals of RX1 138 from the two ADC's 140, 142 are received by the Math block 148 and the averager 150, and further processed through loop filter 152 and voltage or current controlled oscillator 154 similar to what has been described above in FIG. 6 in clock recovery for obtaining the optimal sampling phase at the zero crossing of EQ (1). The output from the math block 148 and the averager 150 is sent to a second multiplexer 156. The second multiplexer 156 during the first timing recovery selects it over another input from the M&M phase detector 158 (or other similar methods and will be discussed later) and passes it to the LF 152 and the VCO 154 to generate the recovered clock. This recovered clock signal 160 is returned to the first ADC 140 to complete the loop. With this arrangement, the same timing recovery method in the first embodiment of FIG. 6 can be used to recover the clock. The math block 148 performs EQ. (1) as described above, similar to the function performed by math block 116 in the scheme of FIG. 6.

Once the clock is recovered, we can use it to sample the first received signal 138 as input to the first equalizer 162 (feed forward equalizer). Thus, the sampled signal 164 coming out from the first ADC 140 is sent to the first FFE 162 of the first receiver 134, with its ISI cancelled by the first decision feedback equalizer DFE 168, and decoded by the first slicer 166 to result in the first recovered signal S1 170.

Once the first feed forward and feedback equalizers are trained, the decoded output S1 170 can correctly recover the transmitted data. Therefore, we can then use the M&M method or other prior art phase detection method to perform the second timing recovery. Thus, the signal from the first ADC (which can, but not necessarily have to, pass through the equalizer) is processed by the M&M phase detector 158 (or other equivalent detector) in conjunction with the decoded output signal S1 170 to detect their phase difference. The M&M phase detectors PD's 158 output is selected by the second multiplexer 156 during the second timing recovery to be processed through the loop filter LF 156 and VCO 154 to recover the clock. A selection algorithm drives the method of selection by the second multiplexer 156 to select between input from the averager 150 and input from the M&M phase detector 158. When we switch the timing recovery method, there is no need for the second sample stream from the second ADC 142. Therefore, we can use the second ADC 142 to sample the second received signal RX2 144 as shown in FIG. 7. Here, for processing the second received signal RX2 144, the first multiplexer 146 selects the RX2 144 and sends it to the second ADC 142. An algorithm directs the first multiplexer 146 to select between RX1 138 and RX2 144 at the proper time. The sampled, digitized signal from the second ADC 142 is then sent through its own loop in the second receiver 136 to result in the recovered second signal S2 174. The loop includes the second FFE 176, second slicer 178 and second DFE 180 in FIG. 7.

Figure 8:
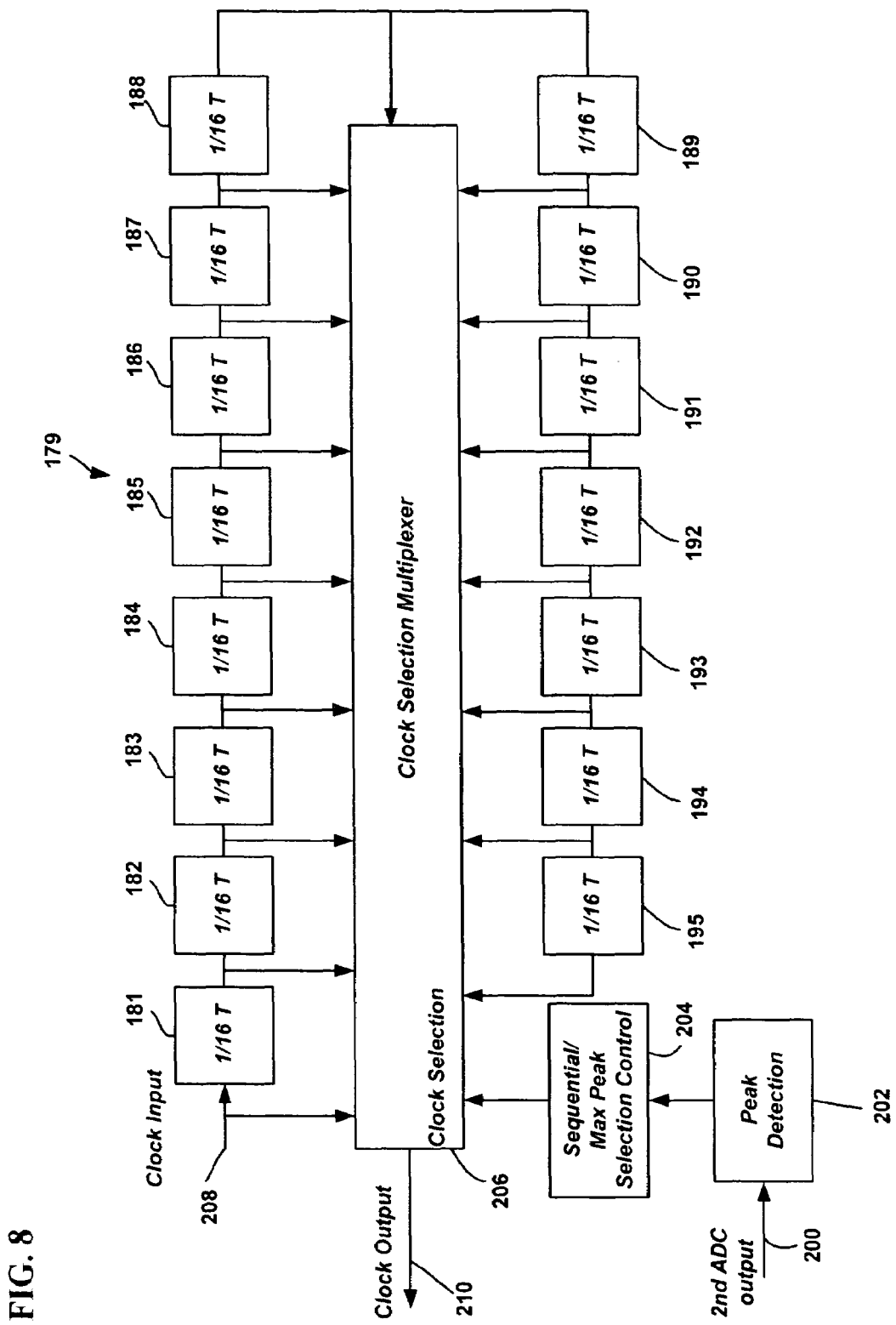
FIG. 8 shows the block diagram of an embodiment of optimum phase selection in the embodiment of FIG. 7 of the present invention.

Before the second feed forward equalizer 176 and second feedback equalizer 180 are to be trained in the second receiver, we need to select a proper delay from the recovered clock to sample the second received signal 144. To effect such a delay, for example, a programmable delay logic 179 can be implemented by a simple shifted-delay line that is well known in the art and is shown in FIG. 8. In this illustration, the VCO output 179 is input to the delay line input 208, fifteen delay taps 181-195 are incorporated to introduce 16 delays over one clock interval T, and one of the tap output is selected as the sampling clock 210 for the second ADC 142 of FIG. 7. In practice, the number of tap delays over one clock interval T can be larger to improve the resolution of the optimum phase selection.

Figure 1A:
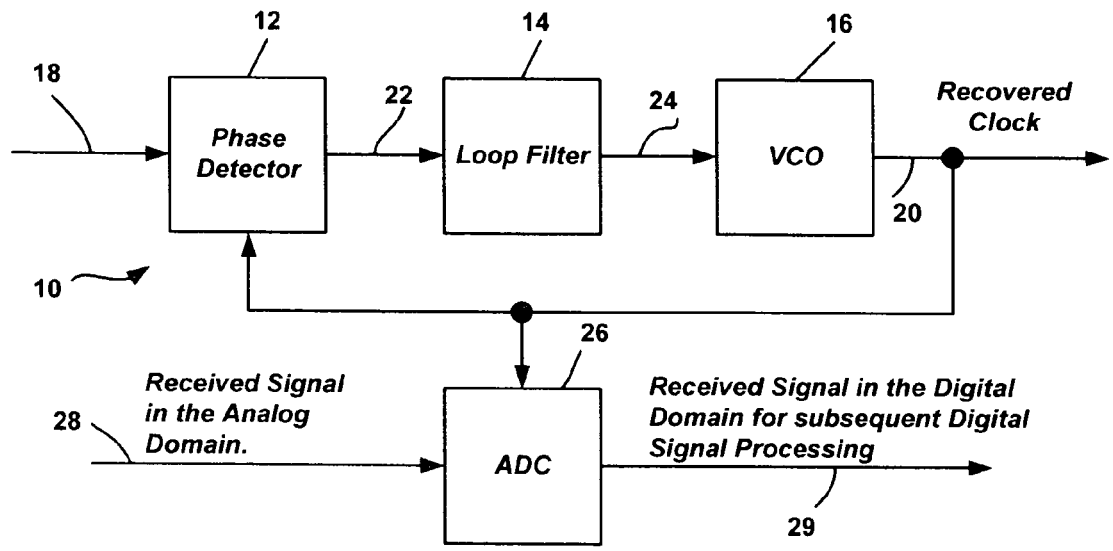
FIG. 1A illustrates the basic baseband timing recovery structure.
Figure 1B:
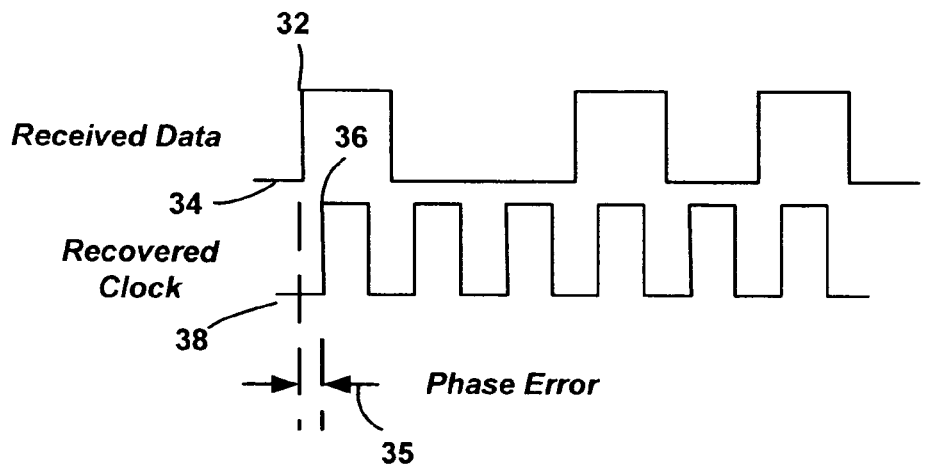
FIG. 1B illustrates the implementation of phase detection using edge detection.
Figure 2:
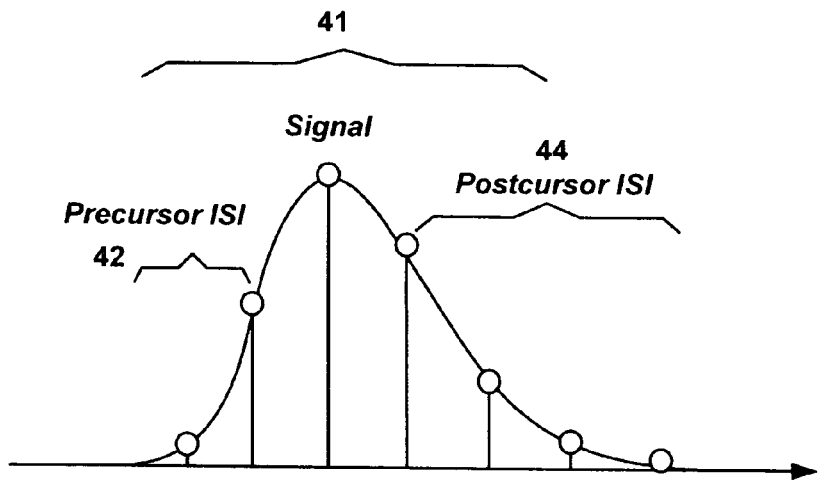
FIG. 2 illustrates the ISI in a band limited digital communication system.
Figure 3:
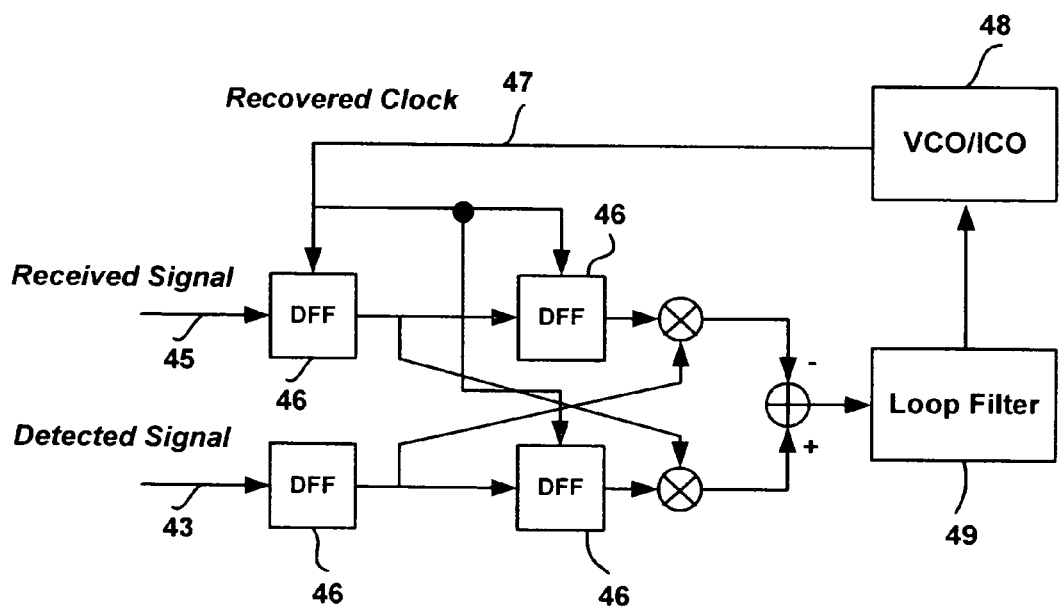
FIG. 3 illustrates the prior M&M method.
Figure 4:
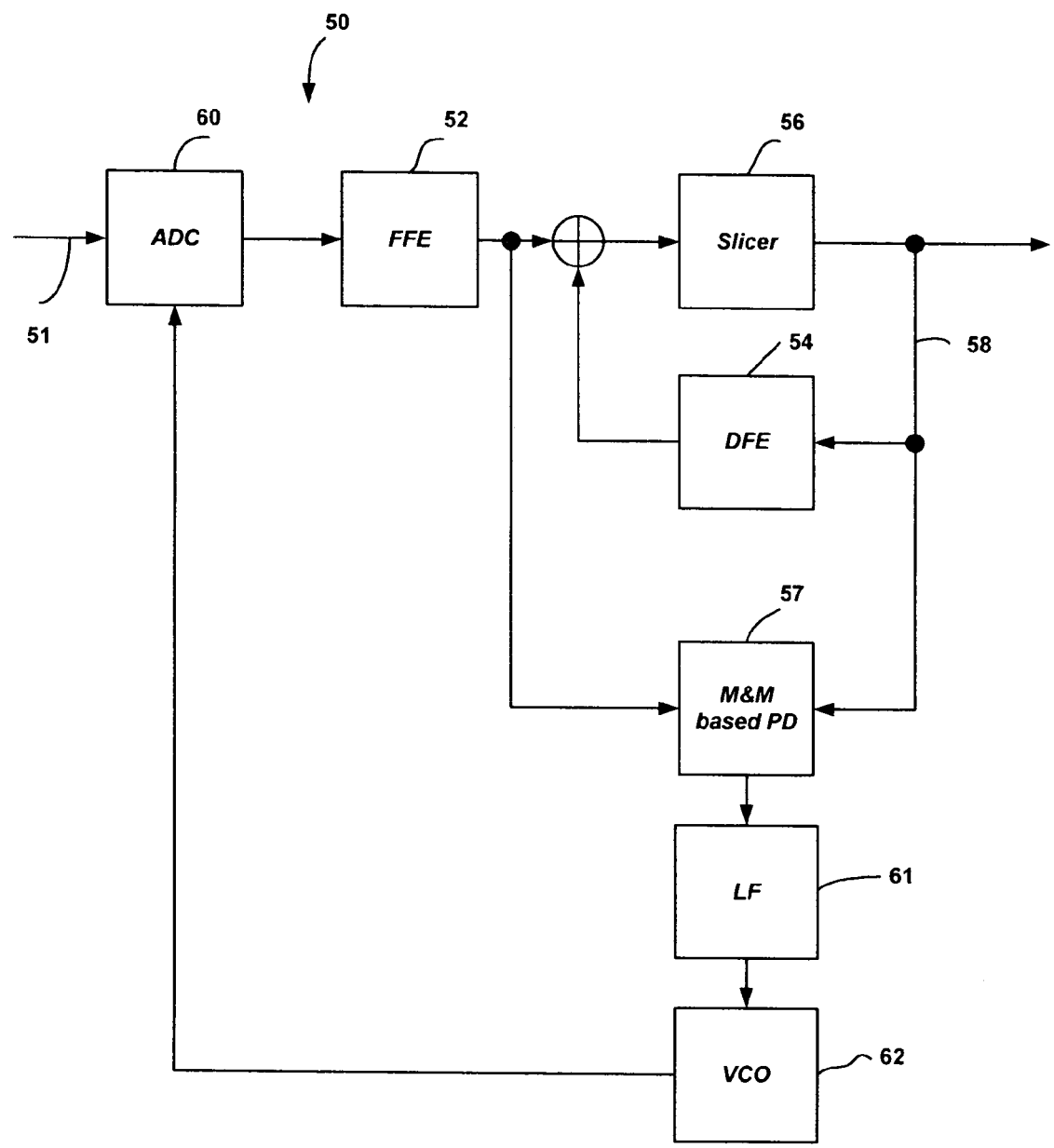
FIG. 4 illustrates a typical receiver that removes ISI before signal detection.

The criterion in choosing one of the tap output is described as follows. Once the multiplexier (MUX) 146 of FIG. 7 selects the second received signal RX2 144 for the second ADC 142, the tap outputs are searched sequentially or with other methods. For each tap selection, peak detection is performed for the second ADC 142 output for a period of time that is long enough to determine a peak in relation to the sampling phase. The interval for this peak detection could range, for example, from 32 clock cycles to 2048 clock cycles. The second ADC output 200 is processed by peak detection 202 and sequential/max peak selection control 204 to drive a clock selection multiplexer 206 to select the signals from the clock input 208 and the taps 181-195 as the clock output 210. The tap selection that results in the maximum peak detection value is selected as the final clock for the sampling clock for the second ADC 142, providing the desired sampling phase. This sampling phase that results in the maximum peak corresponds to the peak of the channel impulse response illustrated in FIG. 2. Thus, the clock for recovery of the signal with reduced ISI from the second received signal RX2 144 is obtained by a delay of the recovered clock of the first received signal RX1 138 based on the phase difference of the two received signals RX1138 and RX2 144.

Figure 9:
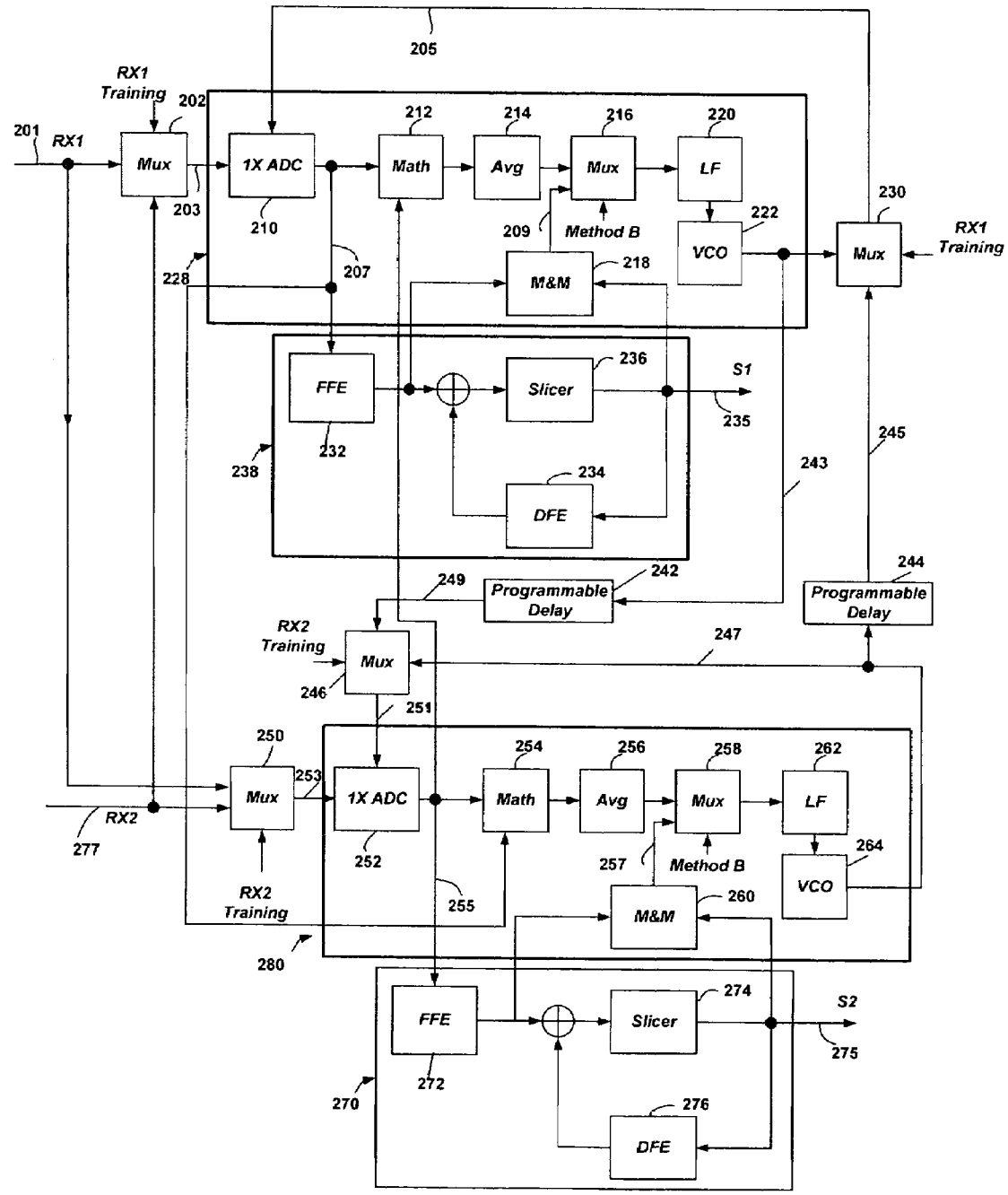
FIG. 9 shows the block diagram of an embodiment of optimum phase selection in another embodiment of the present invention.

The second embodiment of the invention can be extended to a system of multiple receivers that operate at clocks of different frequencies. In this case, the same method and arrangement is used to recover the timing of the first receiver and to train the first equalizer. Once the first equalizer is trained, the equalizer parameters as a result from the first training are memorized. With this, the timing recovery and receiver operation for the first receiver are temporarily stopped and the first ADC is used together with the second ADC for the timing recovery and equalizer training of the second receiver. Once both equalizers are trained, prior art timing recovery methods such as the M&M method are used for each receiver, and the two receivers start to operate independently. Such a system is shown in FIG. 9. The system has a first timing recovery processor 228 for the first receiver-signal processor 238, which processes the first signal RX1 to reduce the ISI components therein. A second timing recover processor 280 recovers a clock signal for the second receiver-signal processor 270, which processes the second signal RX2 to reduce the ISI components therein. Equalizer training on the first signal RX1 can be done in the following way.

The first signal RX1 is selected as the output 203 from Multiplexer 202. Signal 203 from RX1 is input to 1×ADC 210. The first VCO 222 output 243 is selected as the output 205 from Multiplexer 230 as the sampling clock for 1×ADC 210. RX1 is also selected as the output 253 from Multiplexer 250. A delay of half of the sampling interval of VCO output 222 via a Programmable Delay 242 is used as the sampling clock for the second 1×ADC 252. Signal 253, at this time the RX1 signal, is used as the input signal to the second 1×ADC 252, which generates a sampled stream output 255. Two sampled streams 207 and 255 from RX1 are the two signals used in EQ (1) to perform timing recovery and equalizer training of the first receiver 238. When the first receiver 238 is trained with the first timing recovery processor 228, the equalizer coefficients of the first receiver and signal processor 238 are frozen or stored in memory. When the coefficients are stored, RX2 training can begin.

Equalizer training on the second signal RX2 can be done in the following way. The second signal RX2 is selected as the output 253 from Multiplexer 250. Signal 253 (from RX2) is input to 1×ADC 252. The second VCO 264 output 247 is selected as the output 251 of Multiplexer 246 as the sampling clock for 1×ADC 252. RX2 is also selected as the output 203 from Multiplexer 202. A delay of half of the sampling interval of VCO 264 output 247 via a Programmable Delay 244 is used as the sampling clock for the first 1×ADC 210. Signal 203, which comes from RX2, is used as the input signal to the first 1×ADC 210, which generates a sampled stream output 207. Two sampled streams 207 and 255 from RX2 are the two signals used in EQ (1) to perform timing recovery and equalizer training of the second receiver 270. When the second receiver 270 is trained with the second timing recovery processor 280, the equalizer coefficients of the second receiver-signal processor 270 are frozen or stored in memory.

After receivers 238 and 270 are trained separately, timing recovery process which uses M&M process for time recovery (Method B) is switched on, and the respective stored equalizer coefficients for the receivers 238 and 270 are restored. In this case, their respective M&M output 209 and 257 are used as the input to their respective loop filter LF 220 and 262 for their respective timing recovery. The equalizer coefficients for their respective receivers are not changed or adapted until their respective sampling clocks of RX1 and RX2 is reestablished using timing recovery Method B.

Embodiments of the present invention have been described with specificity. It is to be understood that conventional circuitry, transmission devices, microprocessors, computers, and components and combinations thereof, can be used for implementing the present invention. For example, microprocessors with the proper computer code programming can be used for processing various computation or selection blocks of the embodiments of the present invention, such as the Math and Method blocks of, e.g., FIG. 6 and FIG. 7. Such computer code programming is within the skill of one or ordinary skilled in the art. It is to be understood that various combinations and permutations of various parts and components of the schemes disclosed herein can be implemented by one skilled in the art without departing from the scope of the present invention.

What is claimed is:

1. A data communication device, comprising:
  (1) a receiver for receiving and processing one or more incoming signals having intersymbol interference components to produce resultant signals with less interference,
  (2) a timing recovery processor for recovering a clock signal for sampling one or more of the incoming signals having intersymbol interference components, the recovered clock signal having a phase also being suitable for the receiver to reduce the intersymbol interference components; and (3) a detection circuit to recover original transmitted data from the receiver output; wherein the data communication device includes at least one analog to digital converter (ADC), one of the at least one ADC sampling an incoming signal for timing recovery, the device being capable of signal detection of the incoming signal under strong intersymbol interference and performing timing recovery with no more than one ADC per incoming signal stream, the incoming signal has a symbol rate and the timing recovery processor is adapted to recover a timing clock by a phase detector that multiplies two signals, the first one being a difference in value of two consecutive samples of a first ADC sampling output stream at the symbol rate, the second one being a difference in value of the sum of two end samples from twice the value of the mid sample of three consecutive samples of a second ADC sampling output stream at the symbol rate, the first sample of the three consecutive samples of the second ADC sampling output stream leads the first sample of the two consecutive samples of the first ADC output stream by half the period of symbol interval.

2. A device according to claim 1 wherein the timing processor takes two output streams from two different 1×ADC's for timing recovery.

3. A device according to claim 1 wherein the timing recovery processor has an averager that averages the product from the multiplication.

4. A device according to claim 1 wherein two different 1×ADC's are used to process incoming signals to result in the two ADC sampling output streams each at the symbol rate.

5. A device according to claim 1 wherein a 2×ADC is used to process incoming signals to result in the two ADC sampling output streams each at die symbol rate.

6. A data communication device, comprising:
(1) a receiver for receiving and processing one or more incoming signals having intersymbol interference components to produce resultant signals with less interference,
(2) a timing recovery processor for recovering a clock signal for sampling one or more of the incoming signals having intersymbol interference components, the recovered clock signal having a phase also being suitable for the receiver to reduce the intersymbol interference components; and
(3) a detection circuit to recover original transmitted data from the receiver output; wherein the data communication device includes two 1× analog to digital converters (ADC's) to process incoming signals, one of the ADC's sampling an incoming signal for timing recovery, the device being capable of signal detection of the incoming signal under strong intersymbol interference and performing timing recovery with no more than one ADC per incoming signal stream, the incoming signal has a symbol rate and the timing recovery processor is adapted to recover a timing clock by a phase detector that multiplies two signals, the first one being a difference in value of two consecutive samples of a first ADC sampling output stream at the symbol rate, the second one being a difference in value of the sum of two end samples from twice the value of the mid sample of three consecutive samples of a second ADC sampling output steam at the symbol rate, the first sample of the three consecutive samples of the second ADC sampling output stream leads the first sample of the two consecutive samples of the first ADC output stream by half the period of symbol interval.

7. A data communication device, comprising:
(1) a receiver for receiving and processing one or more incoming signals having intersymbol interference components to produce resultant signals with less interference,
(2) a timing recovery processor for recovering a clock signal for sampling one or more or the incoming signals having intersymbol interference components, the recovered clock signal having a phase also being suitable for the receiver to reduce the intersymbol interference components; and
(3) a detection circuit to recover original transmitted data from the receiver output; wherein the data communication device includes a 2× analog to digital converter (ADC) functioning as two ADC's to process incoming signals, one of the ADC's of the 2×ADC sampling an incoming signal for timing recovery, the device being capable of signal detection of the incoming signal under strong intersymbol interference and performing timing recovery with no more than one ADC per incoming signal stream, the incoming signal has a symbol rate and the timing recovery processor is adapted to recover a timing clock by a phase detector that multiplies two signals, the first one being a difference in value of two consecutive samples of a first ADC sampling output stream at the symbol rate, the second one being a difference in value of the sum of two end samples from twice the value of the mid sample of three consecutive samples of a second ADC sampling output stream at the symbol rate, the first sample of the three consecutive samples of the second ADC sampling output stream leads the first sample of the two consecutive samples of the first ADC output steam by half the period of symbol interval.

* * * * *